United States Patent Office 3,761,419
Patented Sept. 25, 1973

3,761,419
ANTIMICROBIC WASHING AGENTS, WASHING ADJUVANTS AND CLEANING AGENTS
Heinz Gunter Nosler, Monheim, Rhineland, Richard Wessendorf, Essen-Heisingen, and Horst Bellinger, Dusseldorf, Germany, assignors to Henkel & Cie GmbH, Dusseldorf-Holthausen, Germany
No Drawing. Continuation-in-part of application Ser. No. 774,183, Nov. 7, 1968, now Patent No. 3,668,135, which is a continuation-in-part of application Ser. No. 747,453, July 25, 1968, now Patent No. 3,592,928. This application Mar. 20, 1972, Ser. No. 236,338
Claims priority, application Germany, June 4, 1968, P 17 67 684.5; July 25, 1967, P 16 68 195.1
Int. Cl. C11d 3/48
U.S. Cl. 252—107                   15 Claims

ABSTRACT OF THE DISCLOSURE

Antimicrobic washing agents and adjuvants and cleaning compositions comprising (a) 0.2 to 30% by weight of a nitroalkyl-N-phenylcarbamate of the formula

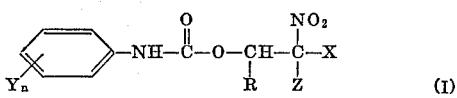

(I)

wherein Y is selected from the group consisting of fluorine, chlorine, bromine, trifluoromethyl and nitro, $n$ is a whole number from 0 to 2, R is selected from the group consisting of hydrogen and methyl, X is selected from the group consisting of hydrogen and bromine and Z is the group of the formula

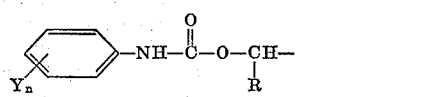

wherein Y, R and $n$ have the above definitions (b) at least 5% by weight of an alkaline builder having calcium carbonate binding capacity in the Hampshire test of not more than 230 mg. per gm. of builder and (c) and optionally other common components of washing agents, washing adjuvants or cleaning compositions.

PRIOR APPLICATIONS

This application is a continuation-in-part application of copending, commonly assigned U.S. patent application Ser. No. 774,183, filed Nov. 7, 1968, now Pat. No. 3,668,-135, which is a continuation-in-part application of copending commonly assigned U.S. patent application Ser. No. 747,453, filed July 25, 1968 now Pat. No. 3,592,928.

THE PRIOR ART

The addition of substances with an antimicrobial action to washing agents is known, especially when the washing agents are to be used under fine washing conditions, that is, at temperatures in the range from 30° to 50° C. These temperatures are not by any means sufficient to kill unwanted micro-organisms such as bacteria or fungi. The cleaning action of the washing agent must therefore be supplemented by a suitable antimicrobial substance. But an addition of antimicrobial substances may also be desirable in the case of washing agents which are intended for use at higher temperatures, especially in the region of the boiling temperatures, especially when the articles to be washed consist of clothing or bed linen from hospitals, where heavy organic contamination, as for example, ointments, blood, pus or sputum, retards the destruction of the micro-organisms. The presence of antimicrobial substances is also frequently desired in the case of cleaning agents which are intended for cleaning other than textile materials in the household, in business and in industry.

OBJECTS OF THE INVENTION

An object of the present invention is the obtention of antimicrobial washing agent and washing adjuvant compositions comprising (a) from 0.2 to 30% by weight of a nitroalkyl-N-phenylcarbamate of the formula

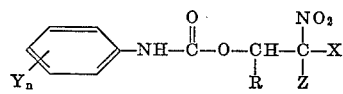

wherein Y is selected from the group consisting of flourine, chlorine, bromine, triflouromethyl and nitro, $n$ is a whole number from 0 to 2, R is selected from the group consisting of hydrogen and methyl, X is selected from the group of hydrogen and bromine and Z is selected from the group consisting of hydrogen, methyl, ethyl and the group of the formula

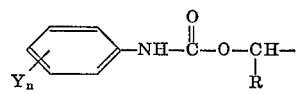

wherein Y, R and $n$ have the above definitions (b) at least 5% by weight of an alkaline builder having calcium carbonate binding capacity in the Hampshire test of not more than 230 mg. per mg. of builder and (c) and optionally other common components of washing agents, washing adjuvants or cleaning compositions.

It is another object of the invention to provide novel antimicrobic washing agents and washing adjuvant compositions comprising (a) 0.2 to 30% by weight of a nitroalkyl-N-phenylcarbamate of the formula

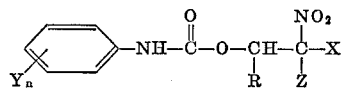

wherein Y is selected from the group consisting of flourine, chlorine, bromine, triflouromethyl and nitro, $n$ is a whole number from 0 to 2, R is selected from the group consisting of hydrogen and methyl, X is selected from the group consisting of hydrogen and bromine and Z is selected from the group consisting of hydrogen, methyl, ethyl and the group of the formula

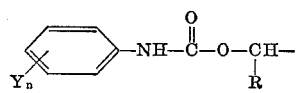

wherein Y, R and $n$ have the above definitions (b) at least 5% by weight of an alkaline builder having calcium carbonate binding capacity in the Hamphire test of not more than 230 mg. per gm. of builder and (c) and optionally other common components of washing agents, washing adjuvants or cleaning compositions in which a portion of alkaline builder in (b) has a calcium carbonate binding capacity greater than 230 mg. per gm. in the Hampshire test.

DESCRIPTION OF THE INVENTION

The antimicrobic washing agents, washing adjuvants and cleaning agents of the invention are comprised of (a) 0.2 to 30% of a nitroalkyl-N-phenyl carbamate of the formula

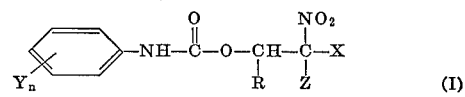

(I)

wherein Y is selected from the group consisting of fluorine, chlorine, bromine, trifluoromethyl and nitro, $n$ is a whole number from 0 to 2, R is selected from the group consisting of hydrogen and methyl, X is selected from the group consisting of hydrogen and bromine and Z is selected from the group consisting of hydrogen, methyl, ethyl and the group of the formula

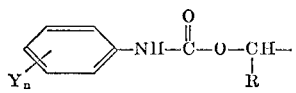

wherein Y, R and n have the above definitions (b) at least 5% by weight of an alkaline builder having calcium carbonate binding capacity in the Hampshire test of not more than 230 mg. per gm. of builder and (c) and optionally other common components of washing agents, washing adjuvants or cleaning compositions. Preferably, the compositions contain 1 to 5% by weight of the nitroalkyl-N-phenylcarbamate of Formula I and at least 10% by weight of the alkaline builder. These mixture components refer to the sum of the quantities of component (a) and the quantities of the water-soluble constituents of components (b) and (c) minus any solvent present.

The above alkaline builders defined under (b) need have no complex-forming ability at all. The usually inorganic salts frequently known as "wash alkalis" are preferably used here. In particular cases, free bases, especially alkali metal hydroxides, may also be used. The alkaline builders according to (b) may have a certain amount of complex-forming ability. The above specifications for the component (b), however, only apply to those fractions whose complex-forming ability does not exceed the limits indicated above.

The presence of substances with higher complex-forming capacity is in no way excluded by this. On the contrary, the builders according to (b) are preferably present together with complex-forming compounds whose ability to form complexes lies above 230 mg. of $CaCO_3$ per gram of complex-forming compound according to the Hampshire test. The ratio of alkaline builders to complex-forming compound may vary within wide limits. A synergistic action between antimicrobial substance and complex-forming compound (above 230 mg. of $CaCO_3$ per gram) is already found when the amount of this complex-forming compound constitutes at least 3% and preferably at least 10% by weight of the washing preparation. The fraction of complex-forming compound in the mixture of complex-forming compound and alkaline builders (b) may amount to 10% to 90%, preferably 25% to 75% by weight.

The same quantitative data apply here also under the same provisos, to the extent that they relate to the whole preparation and not to parts or partial mixtures thereof.

The alkaline builders within the meaning of the invention also include bleaching components, provided they themselves have an alkaline reaction, or the compounds remaining after the release of the active oxygen have an alkaline reaction. Some bleaching components, as for example monoper sulfates or diacyl peroxides, and especially dibenzoyl peroxides, themselves have an acid reaction or provide acid reaction products after the evolution of the oxygen. These non-alkaline-reacting substances may be used as bleaching components in the products according to the invention provided sufficient alkali is present to maintain the pH at the desired value.

If the washing agent and washing adjuvant preparations according to the invention are intended for use with textiles, they should have pH values of about 8 to 12 in a 1% aqueous solution. These pH values are generally adjusted to the weaker alkaline values (pH 8 to 9.5) for fine washing agents and to the more strongly alkaline values (pH 9.5 to 12 preferably 10 to 11.5) for washing agents, for use at higher temperatures up to the boiling point. Also products often intended for cleaning the surfaces of solid materials, with the exception of textiles, in the house, in professional operations and in industry may have pH values of this kind. Still more strongly alkaline-reacting products may also be produced, which for example contain free caustic alkalis, and which, in general, are only used for special purposes.

The washing agents according to the invention can be used for the washing, and washing with bleaching of a large variety of fibers of natural or synthetic origin, such as for example, cotton, regenerated cellulose or linen, as well as for the so-called "easy care" textiles, which consist wholly or partly of highly finished cotton or of synthetic chemical fibers, such as for example, polyamide, polyester, polyacrylonitrile, polyurethane, polyvinyl chloride or polyvinylidene chloride fibers. Also washing adjuvants, such as steeping or after-rinsing preparations, which contain the antimicrobial substances to be used according to the invention, can also be used with advantage. Hair and body washing agents, cleaning agents for the hands and cleaning agents for instruments or for industrial plants, as for example, dairies, breweries and so on, also belong to the preparations according to the invention.

The preparations according to the invention may be produced as lumps, tablets, powders, granulates, agglomerates, pastes or solutions. Apart from preparations in which the pasty nature is due essentially to the presence of corresponding amounts of paste-like surface active compounds (non-ionics), the pasty or liquid nature of the preparation of the invention is mostly due to the presence of corresponding amounts of liquid solvents, in which the other components of the preparation are suspended or dissolved. The content of solvent in these preparations may amount to 40% to 90%, preferably 50% to 85% by weight.

Water is the preferred solvent, but it may be wholly or partly replaced by water-soluble organic solvents, as, for example, monohydric alcohols with 1 to 4, preferably 2 or 3 carbon atoms, polyhydric alcohols with 2 to 5 carbon atoms, partial ethers of these polyhydric alcohols with one another or with the said monohydric alcohols. examples of these comprise alkanols such as ethyl, n- or iso-propyl alcohols, alkanediols and triols such as ethylene glycol, glycerine; alkoxyalkanols such as ethylene glycol monomethyl or monoethyl ethers, glycerine mono- or di-ethers of methyl or ethyl alcohols; and so forth.

In the preparations, according to the invention, water may be present as water of crystallization in salts, especially inorganic salts ($Na_2CO_3.10H_2O$, $Na_3PO_4.12H_2O$, $Na_5P_3O_{10}.6H_2O$). This water is not to be regarded as solvent.

The nitroalkyl-N-phenylcarbamates of Formula I are suitable as antimicrobic agents and especially preferred are those nitroalkyl-N-phenylcarbamates of Formula I in which X is bromine since with their aid preparations with especially high activity, that is with possbily especially low bactericidal or fungicidal concentrations with satisfactory activity can be prepared.

Examples of specific nitroalkyl-N-phenylcarbamates of Formula I are:

2-nitroethyl-N-phenylcarbamate,
2-nitroethyl-N-(3-chlorophenyl)-carbamate,
2-nitroethyl-N-(3,4-dichlorophenyl)-carbamate,
2-nitroethyl-N-(4-nitrophenyl)-carbamate,
1-methyl-2-nitroethyl-N-(3,4-dichlorophenyl)-carbamate,
2-nitropropyl-N-phenyl-carbamate,
2-nitropropyl-N-(3-chlorophenyl)-carbamate,
2-nitrobutyl-N-phenyl-carbamate,
1-methyl-2-nitropropyl-N-phenylcarbamate,
1-methyl-2-nitrobutyl-N-(4-nitrophenyl)-carbamate,
2-bromo-2-nitroethyl-N-(3-chlorophenyl)-carbamate,
1-methyl-2-bromo-2-nitroethyl-N-phenylcarbamate,
2-bromo-2-nitropropyl-N-(3-chlorophenyl)-carbamate,
2-bromo-2-nitrobutyl-N-phenylcarbamate,
2-bromo-2-nitrobutyl-N-(3,4-dichlorophenyl)-carbamate,
1-methyl-2-bromo-2-nitropropyl-N-(4-nitrophenyl)-carbamate,
1-methyl-2-bromo-2-nitrobutyl-N-phenylcarbamate, 2-nitropropanediol-(1,3)-bis-N-phenylcarbamate,
2-nitropropanediol-(1,3)-bis-N-(3,4-dichlorophenyl)-carbamate,
1-methyl-2-nitropropenediol-(1,3)-bis-N-(3-chlorophenyl)-carbamate,
1,3-dimethyl-2-nitropropanediol-(1,3)-bis-N-(4-nitrophenyl)-carbamate,
2-bromo-2-nitropropanediol-(1,3)-bis-N-phenyl-carbamate,
2-bromo-2-nitropropanediol-(1,3)-bis-N-(3-chlorophenyl)-carbamate,
2-bromo-2-nitropropanediol-(1,3)-bis-N-(3,4-dichlorophenyl)-carbamate,
2-bromo-2-nitro-propanediol-(1,3)-bis-N-(4-nitrophenyl)-carbamate,
1-methyl-2-bromo-2-nitropropanediol-(1,3)-bis-N-(3-chlorophenyl)-carbamate,
1,3-dimethyl-2-bromo-nitropropanediol-(1,3)-bis-N-(3,4-dichlorophenyl)-carbamate,
2-nitroalkyl-N-(3-trifluoromethylphenyl)-carbamate,
2-bromo-2-nitro-butyl-N-(3-trifluoromethylphenyl)-carbamate.

Surface-active compounds, possibly including textile softeners, foam stabilizers and/or foam inhibitors, dirt carriers, enzymes, bleaching components and stabilizers for the bleaching components, belong to the other constituents customary in washing agents, washing adjuvants and cleaning agents according to the definition of the invention, and, if percompounds are concerned, also activators for these, scouring agents, perfumes, dyestuffs and so forth.

The composition of the washing agents, washing adjuvants and cleaning agents according to the invention, apart from the antimicrobial substance which is present in amounts from 0.2% to 30% preferably 1% to 5% by weight, lies in general within the range of the following formulation: 0 to 90%, preferably 5% to 40% and especially 12% to 30% by weight of surface-active compounds, possibly including textile softeners or combinations of surface-active compounds, consisting of:

0 to 100%, preferably 25% to 65% by weight of surface-active compounds of the sulfonate and/or sulfate type with preferably 8 to 18 carbon atoms in the hydrophobic residue,
0 to 100%, preferably 5% to 40% by weight of nonionic surface-active compounds,
0 to 100%, preferably 10% to 50% by weight of soap,
0 to 6%, preferably 0.5% to 3% by weight of foam stabilizers,
0 to 8%, preferbaly 0.5% to 5% by weight of non-surface-active foam inhibitors,
5% to 99% preferably 10% to 70% by weight of the usual alkaline-reacting builder according to the above definition, which may be present in combination with complex-forming compounds according to the above definition, where the complexing-forming compound preferably constitutes at least 3% especially at least 10% by weight of the total preparation,
0 to 50% preferably 2% to 15% by weight of other washing agent constituents such as, for example, dirt carriers, optical brightners, enzymes, perfumes, dyestuffs, water.

When the preparations according to the invention have been prepared by spray drying, they usually contain not more than 25% by weight and preferably not more than 20% by weight of water. If, however, the preparations have been converted into a solid state from an aqueous, paste-like starting composition by tying up the liquid water, then the water content may amount to up to 50%.

The washing agents and washing adjuvants according to the invention may further contain bleaching components, which, including activators and/or stabilizers for the percompound present, then constitute 10% to 50%, preferably 15% to 35% by weight of the total washing agent. The bleaching component is generally present in an amount such that its content, calculated as active oxygen, amounts to 1% to 4%, preferably 1.5% to 3.5% by weight. Provided these bleaching agents or the substances formed therefrom after the release of the active oxygen have an alkaline reaction, they are to be regarded as alkaline builders for purposes of calculation of the ingredients of the preparations of the invention.

In the washing agents, the total amount of alkaline-reacting builders and complex-forming compound possibly present is preferably 0.5 to 7 times, and especially 1 to 5 times the total amount of the combined surface-active components present.

The cleaning agents according to the invention may also contain mechanical cleaning substances, the latter usually being present in amounts of at least 30% by weight, preferably 50% to 98% and especially 75% to 95% by weight. Suitable mechanical cleaning substances are preferably fine powders of mostly water-insoluble substances, as for example, quartz flour, marble dust, ground pumice and so forth. The remainder (not more than 70%, preferably 50% to 2% and especially 25% to 5% by weight) consists of the greater part of water-soluble components of the composition according to the invention. Owing to this, the concentration of the antimicrobial compounds referred to the total product may be relatively small. However, since thes products, especially the much used scouring agents, are moistened during their use with only a little water, an entirely adequate concentration of active substances is obtained in spite of the small content of active substances.

The optionally present anionic, amphoteric or nonionic surface-active compounds in the products according to the invention contain in the molecule at least one hydrophobic residue of 8 to 26, preferably 10 to 20 and especially 12 to 18 carbon atoms and an anionic, non-ionic or amphoteric water-solubilizing group. The preferably saturated hydrophobic residue is usually aliphatic or alicyclic, and it may be connected directly with the water-solubilizing groups or via intermediate members. Suitable intermediate members are benzene rings, carboxylic acid ester or carbonamide groups, residues of polyhydric alcohols linked in ether or ester form, as for example those of ethylene glycol, propylene glycol, glycerine or correspondingly polyether residues.

The hydrophobic residue is preferably an aliphatic hydrocarbon residue with 10 to 18 carbon atoms, but deviations from this preferred range of carbons are possible, depending on the nature of the respective surface-active compound.

Soaps derived from natural or synthetic fatty acids, possibly also from resin or naphthenic acids, are utilizable as anionic detergents. Fatty, resin or naphthenic acids of natural origin are often more or less unsaturated. They are preferably used in a partly or completely hydrogenated state, so that they have iodine values of not more than 30 and preferably of less than 10.

Of the synthetic anionic surface-active compounds the sulfonates and sulfates have special practical importance.

Examples of the sulfonates are the alkylarylsulfonates, especially the alkylbenzenesulfonates, which are obtained from preferably straight-chain aliphatic hydrocarbons with 9 to 15, preferably 10 to 10 carbon atoms, by chlorinating and alkylating benzene or from corresponding olefins with terminal or non-terminal double bonds by alkylating of benzene, and sulfonating the alkylbenzenes obtained. Furthermore, aliphatic sulfonates are of interest such as are obtainable from preferably saturated hydrocarbons containing 8 to 18 and preferably 12 to 18 carbon atoms in the molecule by sulfochlorinating with sulfur dioxide and chlorine or sulfoxidating with sulfur dioxide and oxygen and conversion of the products thereby obtained into the sulfonates. Further, mixtures of alkene-sulfonates, hydroxyalkylene-sulfonates and hydroxyalkane-sulfonates are useful as the aliphatic sulfonates, which are obtained, for example, from terminal or non-terminal, $C_8$–$C_{18}$ and preferably $C_{12}$–$C_{18}$ olefins by sulfonation with sulfur trioxide and acid or alkaline hydrolysis of the sulfonation products. In the aliphatic sulfonates thus prepared, the sulfonate group is frequently attached to a secondary carbon atom. Sulfonates with a terminal sulfonate group can also be prepared, however, by reacting terminal olefins with bisulfite.

The sulfonates to be used according to the invention also include salts, preferably di-alkali metal salts of $\alpha$-sulfo-fatty acids, and also salts of esters of these acids with mono- or poly-hydric alcohols containing 1 to 4 and preferably 1 to 2 carbon atoms.

Further useful sulfonates are the fatty acid esters of oxethanesulfonic acid and dihydroxypropanesulfonic acid, the fatty alcohol esters of lower aliphatic or aromatic sulfomono- and-di-carboxylic acids containing 1 to 8 carbon atoms, the alkylglycerylether-sulfonates and the condensation products of fatty acids or sulfonic acids with aminoethanesulfonic acid.

Surface-active compounds of the sulfate type include fatty alcohol sulfates, especially those from coconut fatty alcohols, tallow fatty alcohols or oleyl alcohol. Useful sulfonation products of the sulfate type can also be made from terminal or non-terminal $C_8$–$C_{18}$ olefins. Further, belonging to this group of surface-active compounds are sulfated fatty acid alkylolamides, sulfated monoglycerides and sulfation products of ethoxylated and/or propoxylated fatty alcohols, alkylphenols with 8 to 15 carbon atoms in the alkyl residue, fatty acid amides, fatty acid alkylolamides and so forth, in which case 0.5 to 20, preferably 1 to 8, and advantageously 2 to 4 mols of ethylene oxide and/or propylene oxide may be added to one mol of the said compounds to be ethoxylated and/or propoxylated.

The washing agents according to the invention may also contain surface-active synthetic carboxylates, for example, the fatty acid esters or fatty alcohol ethers of hydroxycarboxylic acids and the condensation products of fatty acids or sulfonic acids with aminocarboxylic acids, for example with glycocoll, sarcosine or protein hydrolysates.

The non-ionic surface-active compounds, here for simplicity called "Non-ionics," include products which owe their solubility in water to the presence of polyether chains, aminoxide, sulfoxide or phosphineoxide groups, alkylolamide groups and very generally to an accumulation of hydroxyl groups.

The products obtainable by the addition of ethylene oxide and/or glycide to fatty alcohols, alkylphenols, fatty acids, fatty amines, fatty acid and sulfonic acid amides, are of particular practical interest, and these non-ionics may contain 4 to 100, preferably 6 to 40, and especially 8 to 20 ether oxygens, particularly ethylene glycol ether oxygens, per molecule. Moreover, propylene or butylene glycol ether oxygens may be present in and/or at the end of these polyglycol ethers.

Further, the non-ionics include the water-insoluble polypropylene glycols which have been made water-soluble by addition of ethylene oxide and are known by the trade names of "Pluronics," "Tetronics" and "Ucon Fluid," and also addition products of propylene oxide to alkylenediamines or lower aliphatic alcohols containing 1 to 8 and preferably 3 to 6 carbon atoms.

Further useful non-ionics are fatty acid or sulfonic acid alkylolamides, which are derived, for example, from mono- or di-alkylolamines, dihydroxypropylamine or other polyhydroxyalkylamines, for example, the glycamines. They can be replaced by amides of higher primary or secondary alkylamines and polyhydroxycarboxylic acids.

From the group of aminoxides, the non-ionics derived from higher tertiary amines having a hydrophobic alkyl residue and two shorter alkyl and/or alkyol residues each containing up to 4 carbon atoms are of special interest.

Amphoteric or zwitterion surface-active compounds contain at least one acid or at least one basic hydrophilic group in the molecule. The acid groups include carboxyl, sulfonic acid, sulfuric acid half ester, phosphonic acid and phosphoric acid partial ester groups. Suitable basic groups are primary, secondary, tertiary and quaternary ammonium groups.

Carboxy-, sulfate- and sulfonate-betaines, owing to their good compatibility with other surface-active compounds, have special interest in practice. Suitable sulfobetaines are obtained, for example, by reacting tertiary amines containing at least one hydrophobic alkyl residue with sultones, for example propane- or butane-sultone. Corresponding carboxybetaines are obtained by reacting the said tertiary amines with chloracetic acid, its salts or chloracetic acid esters, and splitting of the ester linkage.

The foaming power of the surface-active compounds used can be increased or reduced by a combination of suitable surface-active compounds, and the foaming power can of course also be changed by additions of compounds other than surface-active compounds.

The above mentioned non-ionics of the alkylolamide type are known to be suitable as foam stabilizers. Fatty alcohols or higher alkane terminal diols are also utilizable for this purpose.

The foaming power of synthetic anionic or non-ionic surface-active compounds can be reduced by addition of soaps, and with certain combinations of synthetic anionic surface-active compounds, non-ionics and soap, the foaming power is still more greatly reduced. Further, the products of addition of propylene oxide to the above-described surface-active polyethylene glycol ethers are marked by a small foaming capacity, while by varying the number of ethylene glycol and propylene glycol residues present in the molecule, products with a wide variety of turbidity points can be made. These non-ionics act as foam inhibitors on other non-ionics at temperatures above their turbidity point. They can also be combined with other surface-active compounds or mixtures of different surface-active compounds.

Mixtures of anionic surface-active compounds, especially those of the sulfonate and/or sulfate type, non-ionic surface-active compounds and soaps have attained great practical importance, and the foaming tendencies of such combinations may be varied by the choice of the soap. If, for example, these soaps contain 12 to 18 carbon atoms in the fatty acid residue, the mixtures of surface-active compounds show a certain inhibition of foaming, which however is often not sufficient when the washing agents are to be used in drum washing machines at temperatures from 60° to 100° C. In such cases a powerful repression of foaming of synthetic anionic, amphoteric and non-ionic surface-active compounds is obtained by soaps of fatty acid mixtures with 20 to 30, preferably 20 to 26 carbon atoms.

The surface-active compounds, however, may also be combined with known foam inhibitors which are not surface-active. These include N-alkylated aminotriazines, possibly containing chlorine, which are obtained by reacting one mol of cyanuric chloride with 2 to 3 mols of a mono- and/or di-alkylamine with 6 to 20, preferably 8 to 18 carbon atoms in the alkyl residue. Paraffins, halogenated paraffins and aliphatic $C_8$ to $C_{20}$ ketones, can also be used as foam inhibitors, especially in combination with soaps.

By choice of suitable foam inhibitors, it can be arranged that the foam-repressing action does not start until a specified temperature has been exceeded, so that washing agents can be made which still foam in the middle range of temperature up to, for example, 65° C., but which produce less and less foam as the temperature is increased beyond this point. Foam stabilizers and foam inhibitors dependent on temperature can even be combined together.

Foam inhibitors dependent upon temperature include the above-mentioned N-alkylated aminotriazines, and paraffins, halogenated paraffins, ketones etc., the foam repressing action of which becomes particularly strong at temperatures above their melting point. The higher soaps derived from fatty acids with 20 to 30 carbon atoms in the molecule also show a similar action. These soaps may be added in varying amounts, and may constitute 5% to 100% of the total soap fraction present in the surface-active component.

To the above-defined alkaline-reacting builders belong, preferably, the usual, alkaline-reacting constituents of washing and cleaning agents and washing adjuvants, as well as the complex-forming compounds acting synergistically with the antimicrobial substances. The components according to the invention may also contain neutral-reacting salts in addition to these constituents. Such salts are enumerated below essentially according to their chemical nature, without anything being said as to whether they belong to the weaker or stronger complex-forming compounds defined above or to the alkaline builders.

According to the invention, useful, neutral, weakly or more strongly alkaline-reacting salts are, for example, the bicarbonates, carbonates or silicates of the alkali metals, mono-, di- or tri-alkali metal orthophosphates, di- or tetra-alkali metal pyrophosphates, alkali metal metaphosphates known as complex-forming compounds, alkali metal sulfates, and the alkali metal salts of organic, nonsurface-active sulfonic acids, carboxylic acids and sulfocarboxylic acids containing 1 to 8 carbon atoms. These include, for example, water-soluble salts of benzene-, toluene- or xylenesulfonic acids, water-soluble salts of sulfoacetic acid, sulfobenzoic acid or the salts of sulfodicarboxylic acids, and also the salts of acetic acid, lactic acid, citric acid and tartaric acid.

Higher molecular weight polycarboxylic acids or their water-soluble salts may also be present, especially salts of polymerizates of maleic acid, itaconic acid, mesaconic acid, fumaric acid, aconitic acid, methylene-malonic acid and citraconic acid. Salts of copolymerizates of these acids with one another or with other polymerizable substances, as for example, with ethylene, propylene, acrylic acid, methacrylic acid, crotonic acid, 3-butenecarboxylic acid, 3-methyl-3-butenecarboxylic acid and also with vinylmethylether, vinyl acetate, isobutylene, acrylamide and styrene are also useful.

Belonging to the organic complex-forming compounds are, for example, nitrilotriacetic acid, ethylenediamine-tetraacetic acid, N-hydroxyethyl-ethylenediaminetriacetic acid, polyalkylene-polyamine-N-polycarboxylic acids and other known organic complex-forming compounds. Combinations of different complex-forming compounds can also be used. Other known complex-forming compounds also include di- and poly-phosphonic acids of the following constitution:

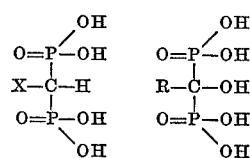

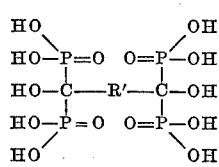

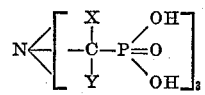

in which R represents alkyl and R' represents alkylene, both with 1 to 8, preferably 1 to 4 carbon atoms, and X and Y represent hydrogen atoms or alkyl with 1 to 4 carbon atoms. Carboxy-methylenephosphonic acid (HOOC—CH$_2$—PO(OH)$_2$)

is also utilizable as a complex-forming compound according to the invention. All these complex-forming compounds may be present as the free acids, but it is preferred to use them as the alkali metal salts.

The following Table I contains data on the ability to form complexes of various compounds determined by the Hampshire test. The operation of the Hampshire test is described in the examples.

TABLE I

| Complex forming compound | Calcium carbonate binding capacity [1] |
|---|---|
| Hydroxymethylphosphonic acid | 1 |
| Mesoxalic acid monohydrate | 6 |
| l-cysteine hydrochloride monohydrate | 14 |
| Glycollic acid | 45 |
| Tetrasodium pyrophosphate | 125 |
| n-Hexylaminodimethylenephosphonic acid | 160 |
| Sodium tripolyphosphate | 214 |
| Hexamethylenediaminetetramethylenephosphonic acid | 220 |
| 1-hydroxyhexane-1,1-diphosphonic acid | 280 |
| α-Aminoethane-α,α-diphosphonic acid | 930 |
| α-Aminobenzyl-α,α-diphosphonic acid | 1,460 |
| Aminotrimethylenephosphonic acid | 820 |
| Ethylenediaminetet-amethylenephosphonic acid | 860 |
| Aminodimethylenephosphonic acid-N-acetic acid | 850 |
| Iminodiacetic acid-N-methylenephosphonic acid | 540 |
| Hydroxyethanediphosphonic acid | 810 |
| Phosphonoacetic acid | 270 |
| Citric acid | 328 |
| Diethylenetriaminepentaacetic acid | 275 |
| 1,2-cyclohexanediaminetetraacetic acid | 285 |
| Ethylenediaminetetraacetic acid | 402 |
| Nitrilotriacetic acid | 578 |

$$\underset{OH}{\underset{|}{\bigcirc}}-CH-NH-CH_2-CH_2-NH-\underset{OH}{\underset{|}{CH}}-\underset{}{\bigcirc} \quad 250$$
(with COOH groups)

| Technical mixture of various metaphosphates (Grahams salt) | 500 |

[1] In mg./g. of complex-forming compound.

Among the bleaching components to be used, compounds with a neutral or alkaline reaction in aqueous solution, especially the perborates, have most practical interest. Of the various perborates, sodium perborate tetrahydrate (NaBO$_2$.H$_2$O$_2$.3H$_2$O) is of great practical importance. Partly or completely dehydrated perborates, i.e. up to the approximate composition NaBO$_2$.H$_2$O$_2$, may also be used in its place. Finally, borates containing active oxygen, NaBO$_2$.H$_2$O$_2$, are also useful in which the ratio Na$_2$O:B$_2$O$_3$ is less than 0.5 to 1 and lies preferably in the range from 0.4–0.15 to 1, and in which the ratio H$_2$O$_2$:Na lies in the range of 0.5–4 to 1. These products are described in the German Pat. No. 901,287 and in the U.S. Pat. No. 2,491,789.

The perborate may be wholly or partly replaced by other inorganic percompounds, especially by peroxyhydrates, as for example, the peroxyhydrates of ortho-, pyro- or poly-phosphates and carbonates.

The washing and cleaning agents and washing adjuvants according to the invention may contain up to 10% preferably from 0.5% to 8% by weight of the usual water-insoluble or water-soluble stabilizers for percompounds. Suitable water-soluble percompound stabilizers are the various magnesium silicates. Precipitation products which are formed on bringing together aqueous solutions of alkali metal silicates with solutions of magnesium salts are mostly concerned here. The proportion MgO:SiO$_2$ may lie in the range of from 4:1 to 1:4, preferably from 2:1 to 1:2. A product with a proportion of MgO:SiO₂ of 1:1 is frequently used. These magnesium silicates may be replaced by the corresponding silicates of other alkaline earth metals, cadmium or tin. Water-containing tin oxides are also useful as stabilizers. These stabilizers are usually present in amounts from 1% to 8%, preferably 2% to 7% of the weight of the total preparation.

The water-insoluble percompound stabilizers may be wholly or partly replaced by water-soluble substances. As such are suitable, above all, the above-enumerated substances with a complex-forming capacity above 230 mg. of CaCO₃ pergram. Provided these are only to stabilize the active oxygen and/or the brightener, without a simultaneous synergistic action with the antimicrobial substances being produced, they may be present in amounts from 0.1% to <5% preferably from 0.2% to 2.5% of the weight of the total preparation, depending on the stability of the formed complexes.

The active chlorine compounds utilizable according to the invention may be inorganic or organic.

The inorganic active chlorine compounds include alkali metal hypochlorites, which can be used especially in the form of their mixed salts or addition compounds with orthophosphates or condensed phosphates such as, for example, pyro- and poly-phosphates or with alkali metal silicates. If the washing agents and adjuvants contain monopersulfates and chlorides, active chlorine is formed in aqueous solution.

Specially suitable organic active chlorine compounds are the N-chloro compounds, in which one or two chlorine atoms are linked to a nitrogen atom, the third valency of the nitrogen atom preferably being satisfied with a negative group, especially a CO or SO₂ group. These compounds include dichloro- and trichloro-cyanuric acid, chlorinated alkylguanides or alkylbiguanides, chlorinated hydantoins and chlorinated melamines.

The preparations according to the invention may also contain enzymes. These, in combination with the disinfectants, have the advantage of loosening protein starch or fat containing contaminations and exposing the microbes possibly enclosed therein and bringing them in contact with the antimicrobial substances. The enzymes may be a variety of types, and may be proteases, carbohydrases, esterases, lipases, oxidoreductases, catalases, peroxidases, ureases, isomerases, liases, transferases, desmolases or nucleases. Proteases, amylases and lipases are of particular practical interest, and above all the active enzymatic substances obtained from *Bacillus subtilis* and *Streptomyces griseus*, especially those of proteolytic nature. Further useful enzymes are pepsin, pancreatin, trypsin, papain and diastase.

The antimicrobial substances to be used according to the invention have the special advantage of being inert towards optical brighteners, which may be contained chiefly in washing adjuvants. In contrast to many known, highly effective antimicrobic compounds, the nitroalkyl-N-phenyl-carbamates of Formula I have a good skin compatibility and little toxicity so that in the event of unintended oral administration as has been observed with liquid washing agents for example, no detriment to health is to be expected.

Examples of optical brighteners from the class of diaminostilbenesulfonic acid derivatives are compounds of the following formula:

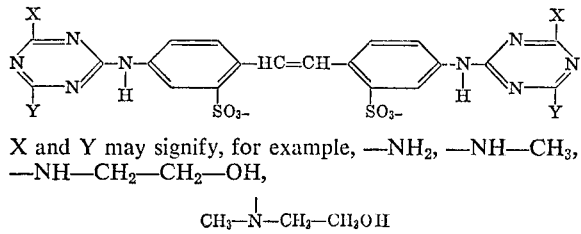

X and Y may signify, for example, —NH₂, —NH—CH₃, —NH—CH₂—CH₂—OH,

CH₃—N—CH₂—CH₂OH

—N(CH₂—CH₂OH)₂, morpholino, dimethyl-morpholino, —NH—C₆H₅, —NH—C₆H₄—SO₃H, —OCH₃, or —Cl, and X and Y may be the same or different.

Further, optical brighteners of the type of diarylpyrazolines according to the following formula may be present:

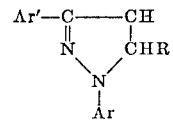

In this formula R signifies a hydrogen atom, an alkyl or aryl residue, which may possibly be substituted, Ar and Ar' signify aryl residues such as phenyl, diphenyl or naphthyl, which may carry further substituents such as hydroxy, alkoxy, hydroxyalkyl, amino, alkylamino, acylamino, carboxyl, sulfonic acid and sulfonamide groups or halogen atoms.

Dirt carriers may also be contained in the preparations of the invention, which keep the dirt, detached from the fibers, suspended in the liquor, and thus prevent greying. Water-soluble colloids of mostly organic nature are suitable for this purpose, such as, for example, the water-soluble salts of polymeric carboxylic acids, glue, gelatine, salts of ethercarboxylic acids or ethersulfonic acids of starch or of cellulose, or salts of acid sulfuric acid esters of cellulose or of starch. Water-soluble polyamides containing acid groups are also suitable for this purpose. Further, starch and other than the above mentioned starch products can be used, such as degraded starch, aldehyde starches and so on. Polyvinylpyrrolidone is also useful.

EXAMPLES

The following examples describe the compositions of some preparations according to the invention. They are not to be deemed to be limitative in any respect, however.

The salt-like components contained therein, such as salt-like surface-active compounds, other organic salts as well as inorganic salts are present as the sodium salts, unless otherwise stated. The names or abbreviations utilized are defined as follows:

"ABS" is the alkali metal salt of an alkylbenzenesulfonic acid with 10 to 15, preferably 11 to 13 carbon atoms in the alkyl chain, obtained by condensing straight-chain olefins with benzene and sulfonating the alkylbenzene thus formed.

"Alkanesulfonate" is an alkali metal sulfonate obtained from paraffins with 12 to 16 carbon atoms by sulfoxidation.

"Fs-estersulfonate" is an alkali metal sulfonate obtained from the methylester of a hardened tallow fatty acid by sulfonating with SO₃.

"Olefinsulfonate" is an alkali metal sulfonate obtained from mixtures of olefins with 12 to 18 carbon atoms on sulfating with SO₃ and hydrolyzing the sulfonation product with caustic solution, the sulfonate consists substantially of alkene sulfonate and hydroxyalkane sulfonate, but also contains, in addition, small amounts of alkane disulfonates. Each olefin sulfonate-containing preparation was prepared using two different types of olefin sulfonates; one was prepared from a mixture of straight-chain terminal olefins, and the other was prepared from a mixture of olefins with a non-alpha double bond.

"KA-sulfonate" and "TA-sulfonate" are the alkali metal salts of sulfated substantially saturated fatty alcohols, prepared by reduction of coconut fatty acid (KA) and tallow fatty acid (TA) respectively.

"KA-EO-sulfonate" and "TA-EO-sulfonate" and "OA-EO-sulfonate" are the sulfated products of addition of 2 mols of ethylene oxide to 1 mol of coconut fatty alcohol (KA), 3 mols of ethylene oxide to 1 mol of tallow fatty alcohol (TA), and 2 mols of ethylene oxide to 1 mol of oleyl alcohol (OA) respectively.

"OA+5EO," "OA+10EO" and "KA+20EO" are the products of addition of ethylene oxide (EO) to technical oleyl alcohol (OA) and coconut alcohol (KA), while the numbers represent the molar amount of ethylene oxide added to 1 mol of alcohol.

"KA+9EO+12PO" is a non-ionic surface-active agent obtained by reacting 1 mol of "KA+9EO" with 12 mols of propylene oxide.

"Perborate" is a product of the approximate composition $NaBO_2 \cdot H_2O_2 \cdot 3H_2O$, containing about 10% of active oxygen.

"NTA," "EDTA" and "EHDP" are the alkali metal salts of nitrilotriacetic acid, ethylenediaminetetraacetic acid and hydroxyethanediphosphonic acid respectively.

"CMC" is the alkali metal salt of carboxymethylcellulose.

"BW-Brightener I" and "BW-Brightener II" are the commercial products "Purwil 4" and "Blankophor BBH/SII" respectively, preferably specified for use with cotton.

"PA-Brightener" is the commercial product "Purwil P," preferably specified for use with polyamides.

"PE-Brightener I" and "PE-Brightener II" are the commercial products "Uvitex SOF" nad "Calcofluor white ALF" respectively, preferably specified for use with polyester.

The composition of the fatty acid mixtures, from which the various soaps contained in the products according to the invention were prepared, may be taken from the following Table II:

TABLE II

Composition of the fatty acid mixtures corresponding to the soaps

| Number of carbon atoms in the fatty acid | Percent by weight of fatty acid component in— | | | |
|---|---|---|---|---|
| | Soap 1018 | Soap 1222 | Soap 1222 u | Soap 1622 |
| $C_{10}$ | 1 | | | |
| $C_{12}$ | 6 | 18 | 14 | |
| $C_{14}$ | 5 | 8 | 6 | |
| $C_{16}$ | 28 | 17 | 13 | 8 |
| $C_{18}$ | 60 | 32 | 60 | 32 |
| $C_{20}$ | | 4 | 3 | 12 |
| $C_{22}$ | | 21 | 4 | 48 |
| Iodine value of the fatty acid mixture | 7.5 | 8 | 76 | 4 |

A mixture of about 45% of a di-(alkylamino)-monochlorotriazine and about 55% of a N,N',N"-trialkylmelamine was used as foam inhibitor. In all these triazine derivatives, the alkyl residues are present as a mixture of homologs with 8 to 18 carbon atoms. The monochlorotriazine derivative or the trialkylmelamine can also be used alone with a similar result. Provided the described products contain synthetic sulfates or sulfonates together with soap, the other non-surface-active foam inhibitors mentioned in the description can also be used, as for example, paraffin oil or paraffin. In the production of the preparations, the foam inhibitor used was dissolved in a suitable organic solvent or sprayed in the molten state on the moving pulverulent preparation by means of a jet nozzle.

If the preparations according to the invention were present as pulverulent products, the antimicrobial substances were incorporated in the same way as described with the foam inhibitors. Foam inhibitors ande antimicrobial substances were of course sprayed on successively.

The composition of the preparations according to Examples 1 to 12 can be seen from the following Tables III and IV. The sign "+" in the line "$Na_2SO_4$" means that small amounts of sodium sulfate were present as impurities in the anionic surface-active compounds. The Roman numerals in the line "antimicrobial substance" represent the substance present in each case, and in the line below, the amount of the substance is given. In the last line no values are given under "Remainder"; these can be calculated as the difference between 100 and the amounts of the other components. Of the preparations described, the residue consists to a substantial part of water. If $Na_2SO_4$ is present only in small quantities arising from the synthetic anionic surface-active compound (sign "+" in the $Na_2SO_4$ line of the table), the residue also contains the $Na_2SO_4$ present. Moreover, any dyestuffs, perfumes and enzymes present come under the residue.

The following antimicrobial substances were used:

(A) 2-nitropropyl-N-phenylcarbamate
(B) 1-methyl-2-nitropropyl-N-phenylcarbamate
(C) 2-nitrobutyl-N-phenylcarbamate
(D) 2-bromo-2-nitroethyl-N-(3-chlorophenyl)-carbamate
(E) 2-bromo-2-nitrobutyl-N-(4-nitrophenyl)-carbamate
(F) 2-bromo-2-nitrobutyl-N-phenylcarbamate
(G) 2-bromo-2-nitrobutyl-N-(3,4-dichlorophenyl)-carbamate
(H) 2-bromo-2-nitropropyl-N-phenylcarbamate
(I) 2-bromo-2-nitrobutyl-N-(p-fluorophenyl)-carbamate
(K) 2-bromo-2-nitropropanediol-(1,3)-bis-N-phenylcarbamate
(L) 2-bromo-2-nitropropanediol-1,3)-bis-N-(3-chlorophenyl)-carbamate
(M) °2-bromo-2-nitropropanediol-(1,3)-bis-N-(3,4-dichlorophenyl)-carbamate
(N) 2-bromo-2-nitropropanediol-(1,3)-bis-N-(4-nitrophenyl)-carbamate The products described in the Examples 1 to 12 can be preferably used for the following purposes:

Example 1: Steeping agent or complete washing agent.
Examples 2–4 and 6–9: All purpose washing agent.
Example 5: Washing agent for colored goods free from perborate and brighteners.
Example 10: Washing agent for colored goods free from brighteners, but containing perborate.
Examples 11 and 12: Fine washing agent: also intended for use with easy-care textiles.

All the washing agents described above may be used in drum washing machines even at temperatures of from 90° to 100° C. without foaming over.

TABLE III

| Components of the preparation | Percent by weight of component in the preparation according to Example— | | | | |
|---|---|---|---|---|---|
| | 1 | 2 | 3 | 4 | 5 |
| ABS | | 9.0 | 11.0 | | |
| Olefin sulfonate | 5.0 | | | | 11.5 |
| Soap 1018 | | | | | 9.0 |
| Soap 1622 | | 2.0 | | | |
| OA+5 EO | | | | | 5.0 |
| OA+10 EO | | 8.0 | 6.0 | | |
| KA+20 EO | | | | 12.0 | |
| KA+9 EO+12 PO | 3.0 | | | 7.5 | |
| Foam inhibitor | 0.3 | | 0.5 | | 0.8 |
| $Na_2SO_4$ | | + | + | | + |
| $Na_2O \cdot 3.3 SiO_2$ | | 4.5 | 4.0 | 4.5 | 6.0 |
| $Na_4P_2O_7$ | 9.0 | | | 12.0 | |
| $Na_5P_3O_{10}$ | 63.0 | 45.0 | 19.0 | | 30.0 |
| Perborate | | 16.0 | 21.0 | 16.0 | |
| $MgSiO_3$ | | 1.0 | 1.6 | 1.0 | 1.6 |
| NTA | | | 18.0 | 19.0 | |
| EDTA | 0.5 | | | | |
| EHDP | | | 6.6 | 14.0 | 28.0 |
| CMC | 1.6 | 1.5 | 1.3 | 1.5 | 1.3 |
| Antimicrobial substance | F | G | A | B | H |
| Quantity | 6.1 | 4.7 | 5.0 | 3.3 | 4.1 |
| BW-Brightener I | | 0.5 | 0.5 | | |
| BW-Brightener II | | 0.3 | | 0.7 | |
| PA-Brightener | | 0.05 | 0.2 | 0.2 | |
| PE-Brightener I | | | 0.2 | | |
| PE-Brightener II | | | | 0.2 | |
| Residue | | | | | |

TABLE IV

| Components of the preparation | Percent by weight of component in the preparation according to Example— | | | | | | |
|---|---|---|---|---|---|---|---|
|  | 6 | 7 | 8 | 9 | 10 | 11 | 12 |
| ABS | 8.5 |  |  |  |  |  |  |
| Alkane sulfonate |  | 7.5 |  |  |  |  |  |
| FS-ester sulfonate |  | 6.5 |  |  |  |  |  |
| Olefin sulfonate |  |  | 8.0 |  |  |  | 15.0 |
| KA-sulfate | 1.6 | 2.8 | 1.7 |  |  | 1.5 | 3.2 |
| TA-sulfate | 0.5 |  |  | 3.0 |  | 1.5 |  |
| KA-EO-sulfate | 2.0 |  |  |  | 2.3 |  | 7.5 |
| TA-EO-sulfate |  |  |  |  |  | 7.5 |  |
| OA-EO-sulfate |  |  |  |  | 5.5 |  |  |
| Soap 1018 |  |  |  |  |  | 4.15 |  |
| Soap 1222 |  | 5.8 | 9.3 |  | 10.2 | 6.5 |  |
| Soap 1222 u |  |  |  | 6.8 |  |  |  |
| OA + 5 EO |  | 2.5 |  |  |  | 6.5 |  |
| OA + 10 EO |  |  | 2.7 | 4.2 |  |  |  |
| Foam inhibitor |  | 0.6 |  |  | 0.8 |  | 0.9 |
| $Na_2SO_4$ | + | + | + | + | 5.0 | 18.0 | 10.0 |
| $Na_2O \cdot 3.3SiO_2$ | 5.0 | 4.0 |  | 4.2 | 3.5 | 3.7 |  |
| $Na_5P_3O_{10}$ | 28.0 | 24.0 | 38.0 | 21.0 | 33.0 | 35.0 | 48.0 |
| Perborate | 24.0 | 25.0 | 23.6 | 28.0 | 22.0 |  |  |
| $MgSiO_3$ | 2.0 |  |  | 3.0 |  |  |  |
| NTA | 15.0 | 5.0 |  | 8.0 |  | 10.0 |  |
| EDTA | 0.22 | 0.25 | 0.5 | 0.4 |  |  |  |
| CMC | 1.3 | 1.9 | 1.2 | 1.4 | 1.5 | 1.3 | 1.7 |
| Antimicrobial substance | K | D | C | M | E | L' | N |
| Quantity | 2.2 | 3.8 | 8.7 | 4.3 | 2.4 | 4.5 | 3.6 |
| BW-Brightener II | 0.5 | 0.4 | 0.2 | 0.35 |  |  |  |
| PA-Brightener |  | 0.04 | 0.5 | 0.03 |  |  |  |
| PE-Brightener I |  |  | 0.15 |  |  |  |  |
| PE-Brightener II |  |  |  | 0.10 | 0.7 |  |  |
| Residue |  |  |  |  |  |  |  |

Example 13

A liquid washing agent present as a pourable suspension of undissolved components in an aqueous solution had the following composition:

|  | Percent by weight |
|---|---|
| ABS | 10.0 |
| Coconut fatty acid diethanolamide | 8.5 |
| Potassium toluenesulfonate | 6.0 |
| $Na_5P_3O_{10}$ | 20.0 |
| $K_5P_3O_{10}$ | 10.0 |
| CMC | 1.5 |
| Antimicrobial substance I | 7.6 |
| Water | Remainder |

The antimicrobial action of this product is improved when the content of $Na_5P_3O_{10}$ is reduced to 18 to 15% by weight and 2 to 5% by weight of EDTA or EHDP is incorporated therefore.

Example 14

During the usual preparation of a toilet soap from a mixture of 60% of coconut fatty acid and 40% of tallow fatty acid, there are incorporated in the screw extruder together with the dyestuff and perfume, such amounts of the antimicrobial F that the finished soap contains 2.5% by weight thereof. The action of the antimicrobial substance is further increased when such amount of NTA, EDTA, or EHDP are incorporated that their fraction in the soap is 8% by weight.

Example 15

As described in Example 14, two washing agent preparations were prepared of the following compositions *a* and *b*:

| a | b |  |
|---|---|---|
| 57% | 59% | By weight of a 1-alkanesulfonate, prepared from mixture of olefins with terminal double bonds containing 12-18 carbon atoms, by addition of sodium bisulfite. |
| 28% | 29% | By weight of soap (80% of tallow and 20% of coconut fatty acid). |
| 3% | 5% | By weight of antimicrobial substance M. |
| 5% | 0% | By weight of NTA, EDTA or EHDP. |
| 7% | 7% | By weight of water. |

Example 16

A bottle-washing agent used in the liquor industry had the following composition:

53.0% by weight of commercial sodium hydroxide
15.0% by weight of tetrapolyphosphate
10.0% by weight of $Na_2O \cdot 3.3SiO_2$
12.0% by weight of aminotri-(methylenephosphate)
10.0% by weight of antimicrobial substance K

Example 17

A washing agent for pre-washing which even at temperatures up to 60° C. makes possible an extensive, if not complete disinfection, had the following composition:

8.0% by weight of ABS, alkanesulfonate or olefinsulfonate
4.0% by weight of Soap 1622
0.3% by weight of foam inhibitor
36.0% by weight of $Na_4P_2O_7$
7.5% by weight of NaOH
0.8% by weight of $Na_2SO_4$
24.0% by weight of antimicrobial substance H
Remainder water

Example 18

An after-rinsing agent for laundered articles, which at the same time dissolves deposits on the fiber, especially lime-containing deposits, had the following composition:

30.0% by weight of perborate
30.0% by weight of EHDP
2.6% by weight of antimicrobial substance F
29.4% by weight of $Na_2SO_4$
8.0% by weight of $MgSiO_3$ When articles to be washed are treated in the usual way using the preparations according to Examples 1 to 13, and 17 to 18, an antimicrobial action is obtained which is prolonged over the whole time of treatment. If the products contain bleaching components, the antimicrobial action of the active substances used according to the invention is also still present before employment or after conclusion of the action of the bleaching component. If after-rinsing agents with a content of such antimicrobial substances are used in the last rinsing bath, the small quantities of antimicrobial substance remaining on the fiber also act after the end of the washing process and after the bleaching of the washed textiles.

Example 19

A scouring agent with a disinfectant action had the following composition:

95% by weight of quartz flour, finely ground
5% by weight of a fine powder of the following composition
   20% by weight of ABS
   35% by weight of $Na_5P_3O_{10}$
   10% by weight of NTA
   15% by weight of $Na_2SO_4$
   15% by weight of antimicrobial substance F
   Remainder water An exact description of the method of analysis for the determination of the calcium carbonate binding capacity is found in the publication of the Hampshire Chemical Corp. of June 1960 "Hampshire NTA Technical Bulletin," Appendix S.A2. According to this, exactly 2 g. of pulverulent complex-forming compound are dissolved in 50 ml. of distilled water. The solution is neutralized, treated with 10 ml. of a 2% sodium carbonate solution, its pH value adjusted to 11 to 12 and the solution diluted to 100 ml. It is then treated with a calcium acetate solution, which contains 44.1 g. of calcium acetate monohydrate per liter, until a distinct and lasting turbidity occurs. The calcium carbonate binding capacity of the complex-forming compound is calculated by the formula:

$$\frac{\text{ml. calcium acetate solution} \times 25}{\text{weight of complex-forming compound}} = \text{mg. of } C_aCO_3$$

bound per gram of complex-forming compound.

Example 20

5 gm. of each of the washing compositions of Table I (percent by weight values) were dissolved in 1 liter of water and 30 ml. of each of the resulting solutions were added to 8 100 ml. ground-in stoppered bottles. The bottles were held at 50° C. with a shaking thermostat and a 1 cm. square sterile cotton substrata infected with Staphylococcus aureus SG511 was inserted into each bottle. After the time intervals reported in Table VI, the cotton substrata was removed from each bottle, was rinsed twice with 20 ml. of sterile water and then was placed into a small tube with Standard-I-Bouillon solution of Merck and Co. containing 1% by weight of Tween 80. The tubes were then incubated for 72 hours at 37° C. Subcultures were prepared from the tubes that showed turbidity after incubation on Standard-I-Bouillonagar of Merck and Co. to study the growth of the organisms. The results are expressed in Table VI as + for growth, — for no growth and ± for growth indications.

Antimicrobic substance K is 2-bromo-2-nitropropanediol-(1,3)-bis-N-phenylcarbamate; substance L is 2-bromo - 2 - nitropropanediol - (1,3)-bis-N-(3-chlorophenyl)-carbamate; substance M is 2-bromo-2-nitropropanediol-(1,3)-bis-N-(3,4-dichlorophenyl)-carbamate; substance N is 2 - bromo - 2 - nitropropanediol-(1,3)-bis-N-(4-nitrophenyl)-carbamate.

builder of the claim while washing agent 3 has all three and a greater antimicrobic activity than the other compositions.

The preceding specific embodiments are illustrative of the practice of the invention. It is to be understood, however, that other expedients known to those skilled in the art may be employed without departing from the spirit of the invention or the scope of the appended claims.

We claim:

1. Antimicrobic washing agents, washing adjuvants and cleaning agent preparations consisting essentially of (a) 0.2 to 30% by weight of a nitroalkyl-N-phenylcarbamate of the formula

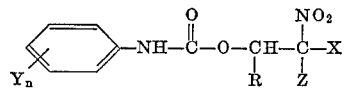

wherein Y is selected from the group consisting of fluorine, chlorine, bromine, trifluoromethyl and nitro, $n$ is a whole number from 0 to 2, R is selected from the group consisting of hydrogen and methyl, X is selected from the group consisting of hydrogen and bromine and Z is a group of the formula

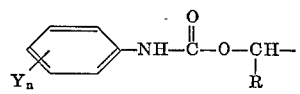

wherein Y, R and $n$ have the above definitions, (b) at least 5% by weight of an alkaline builder having calcium carbonate binding capacity in the Hampshire test of not more than 230 mg. per gm. of builder selected from the group consisting of alkali metal hydroxides, carbonates,

TABLE V

| | No. washing agent | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| ABS | 12 | 12 | 12 | 12 | 12 | 12 | 12 | 12 | 12 | 12 | 12 | 12 | 12 | 12 | 12 | 12 | 12 |
| Oleyl alcohol + 10 moles of Ethylene oxide | 8 | 8 | 8 | 8 | 8 | 8 | 8 | 8 | 8 | 8 | 8 | 8 | 8 | 8 | 8 | 8 | 8 |
| Na$_4$P$_2$O$_7$ | 20 | | 10 | 20 | | 10 | | | | 10 | | 20 | | 10 | 20 | | 10 |
| Na$_2$CO$_3$ | | | | | | | 20 | 10 | | | 10 | | | | | | |
| NaO$_2$·3.3 SiO$_2$ | 6 | 6 | 6 | 6 | 6 | 6 | 6 | 6 | 6 | 6 | 6 | 6 | 6 | 6 | 6 | 6 | 6 |
| Sodium perborate | 28 | 28 | 28 | 28 | 28 | 28 | 28 | 28 | 28 | 28 | 28 | 28 | 28 | 28 | 28 | 28 | 28 |
| EDTA | | 20 | 10 | | 20 | 10 | | 10 | | | | | 20 | 10 | | 20 | 10 |
| Hydroxyethanediphosphonic acid | | | | | | | | | 20 | 10 | 10 | | | | | | |
| MgSiO$_3$ | 3 | 3 | 3 | 3 | 3 | 3 | 3 | 3 | 3 | 3 | 3 | 3 | 3 | 3 | 3 | 3 | 3 |
| Na$_2$SO$_4$ | 18 | 18 | 18 | 18 | 18 | 18 | 18 | 18 | 18 | 18 | 18 | 18 | 18 | 18 | 18 | 18 | 18 |
| Antimicrobic substance K | 5 | 5 | 5 | | | | | | | | | | | | | | |
| Antimicrobic substance L | | | | 5 | 5 | 5 | 5 | 5 | 5 | 5 | 5 | | | | | | |
| Antimicrobic substance M | | | | | | | | | | | | 5 | 5 | 5 | | | |
| Antimicrobic substance N | | | | | | | | | | | | | | | 5 | 5 | 5 |

NOTE.—ABS=Alkali metal salt of alkylbenzene sulfonic acid with 11 to 13 carbon atoms in alkyl chain.

TABLE VI

| | Samples taken after (minutes)— | | | | | | | |
|---|---|---|---|---|---|---|---|---|
| | 5 | 10 | 15 | 30 | 45 | 60 | 90 | 120 |
| Washing agent No.: | | | | | | | | |
| 1 | + | + | + | + | + | + | ± | — |
| 2 | + | + | + | + | + | ± | — | — |
| 3 | + | + | + | — | — | — | — | — |
| 4 | + | + | + | + | + | + | — | — |
| 5 | + | + | + | + | + | ± | — | — |
| 6 | + | + | — | — | — | — | — | — |
| 7 | + | + | + | + | + | + | ± | — |
| 8 | + | + | ± | ± | — | — | — | — |
| 9 | + | + | — | ± | — | — | — | — |
| 10 | + | ± | — | — | — | — | — | — |
| 11 | ± | ± | — | — | — | — | — | — |
| 12 | + | + | + | + | + | + | + | ± |
| 13 | + | + | + | + | + | ± | — | — |
| 14 | + | + | + | + | + | — | — | — |
| 15 | + | + | + | + | + | + | ± | ± |
| 16 | + | + | + | + | + | + | — | — |
| 17 | + | + | + | ± | — | — | — | — |

The results of Table VI clearly show the synergistic antimicrobic activity of the three component compositions of the above application which are compositions 3,6,8,10, 11,14 and 17 as compared to any combination of two of the said components. For example, washing agent 1 lacks a complex-former and washing agent 2 lacks the alkaline tripolyphosphates, and sulfates and (c) at least 3% by bicarbonates, silicates, ortho phosphates, pyrophosphates, weight of complex-forming compounds which, in the Hampshire test, have a complex-forming ability of over 230 mg. of CaCO$_3$ per gram of said complex-forming compounds selected from the group consisting of Graham's salt, nitrilotriacetic acid, ethylene-diaminetetra-acetic acid, N-hydroxyethyl-ethylenediaminetriacetic acid, polyalkylene-polyamine-N-polycarboxylic acids, polyphosphonic acids, carboxymethylenephosphonic acid, aminotrimethylene-phosphonic acid, iminodiacetic acid-N-methylene phosphonic acid, phosphonoacetic acid, citric acid and 1,2-cyclohexane-diaminotetraacetic acid.

2. The antimicrobial compositions of claim 1 wherein the alkaline builder is present in an amount of at least 10% by weight.

3. The antimicrobial preparations of claim 1 wherein said antimicrobial component (a) is present in an amount of from 2 % to 5% by weight.

4. The antimicrobial preparations of claim 1 wherein said complex-forming compounds of (c) are present in an amount of at least 10% by weight.

5. The antimicrobial preparations of claim 1 wherein said complex-forming compounds of (c) are present in an amount of between 10% to 90% of the amount of the mixture of said complex-forming compounds and said components (b).

6. The antimicrobial preparations of claim 5 wherein said complex-forming compounds are present in an amount of between 25% to 75% of the amount of the mixture of said complex-forming compounds and said components (b).

7. The antimicrobial preparations of claim 1 wherein said antimicrobial component is 2-bromo-2-nitropropane-diol-(1,3)-bis-N-phenylcarbamate.

8. The antimicrobial preparations of claim 1 wherein said antimicrobial component is 2-bromo-2-nitropropane-diol-(1,3)-bis-N-(3-chlorophenyl)-carbamate.

9. The antimicrobial preparations of claim 1 wherein said antimicrobial component is 2-bromo-2-nitropropane-diol-(1,3)-bis-N-(3,4-dichlorophenyl)-carbamate.

10. The antimicrobial preparations of claim 1 wherein said antimicrobial component is 2-bromo-2-nitropropane-diol-(1,3)-bis-N-(4-nitrophenyl)-carbamate.

11. Antimicrobic washing agents and washing adjuvant and cleaning agent preparations comprising (a) 0.2 to 30% by weight of a nitroalkyl-N-phenylcarbamate of the formula

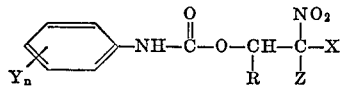

wherein Y is selected from the group consisting of fluorine, chlorine, bromine, trifluoromethyl and nitro, $n$ is a whole number from 0 to 2, R is selected from the group consisting of hydrogen and methyl, X is selected from the group consisting of hydrogen and bromine and Z is a group of the formula

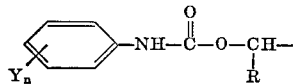

wherein Y, R and $n$ have the above definitions, (b) from 0 to 90% by weight of surface-active compound components comprising from 0 to 100% of surface-active compounds selected from the group consisting of sulfates and sulfonates said compounds having a hydrophobic residue of from 8 to 18 carbon atoms from 0 to 100% of nonionic surface-active compounds, from 0 to 100% of soap, (c) from 5% to 99% by weight of water soluble components comprising from 10% to 90% by weight of components (c) of alkaline reacting builders which, in the Hampshire test, have a complex-forming ability of not more than 230 mg. of $CaCO_3$ per gram selected from the group consisting of alkali metal hydroxides, carbonates, bicarbonates, silicates, orthophosphates, pyrophosphates, tripolyphosphates and sulfates and from 90% to 10% by weight of component (c) of complex-forming compounds which, in the Hampshire test, have a complex-forming ability of over 230 mg. of $CaCO_3$ per gram selected from the group consisting of Graham's salt, nitrilotriacetic acid, ethylene-diaminetetraacetic acid, N-hydroxyethyl-ethylenediaminetriacetic acid, polyalkylene-polyamine-N-polycarboxylic acids, polyphosphonic acids, carboxy-methylene-phosphonic acid, aminotrimethylenephosphonic acid, iminodiacetic acid-N-methylenephosphonic acid, phosphonoacetic acid, citric acid, and 1,2-cyclohexanedi-aminotetraacetic acid.

12. The antimicrobial preparations of claim 11 wherein the compositions also contain from 10% to 50% by weight of inorganic percompounds.

13. The antimicrobial preparations of claim 4 wherein said components (b) comprise from 75% to 90% by weight.

14. Pasty and liquid washing and washing adjuvants comprising from 10% to 60% by weight of the antimicrobial preparations of claim 11 and from 40% to 90% by weight of a liquid solvent selected from the group consisting of water, water-soluble organic solvents and mixtures thereof.

15. The antimicrobial composition of claim 1 containing at least 30% by weight of a powder of a water-insoluble cleaning substance.

References Cited
UNITED STATES PATENTS

| | | | |
|---|---|---|---|
| 2,951,786 | 9/1960 | Pullen et al. | 424—300 |
| 3,029,273 | 3/1962 | Beaver et al. | 260—471 |
| 3,253,904 | 5/1966 | Harrison | 260—471 |
| 3,439,019 | 4/1969 | Sanett et al. | 260—472 |
| 3,507,796 | 4/1970 | Voss | 252—106 |

LEON D. ROSDOL, Primary Examiner

P. E. WILLIS, Assistant Examiner

U.S. Cl. X.R.

252—106

UNITED STATES PATENT OFFICE
CERTIFICATE OF CORRECTION page 1 of 2

Patent No. 3,761,419　　　　Dated Sept. 25, 1973

Inventor(s) HEINZ GUNTER NOSLER, RICHARD WESSENDORF and HORST BELLINGER

It is certified that error appears in the above-identified patent and that said Letters Patent are hereby corrected as shown below:

| IN THE PATENT | | APPLICATION | | |
|---|---|---|---|---|
| Col. | Line | Page | Line | |
| 4 | 7 | 7 | 28 | "cottor" should be --cotton-- |
| 4 | 37 | 8 | 24 | "examples" should be --Examples-- |
| 5 | 63 | 11 | 22 | "brightners" should be --brighteners-- |
| 6 | 29 | 12 | 31 | "thes" should be --these-- |
| 6 | 65 | 14 | 14 | "10 to 10" should be --10 to 14-- |
| 10 | Table I | 22 | | "Ethylenediaminetet-amethylenephosphonic" should be --Ethylenediaminetetramethylenephosphonic-- |
| 13 | 60 | 30 | 15 | "ande" should be --and-- |

CLAIMS

Claim 1

Under (b) between "carbonates" and "tripolyphosphates" the following was omitted and should be inserted:

--bicarbonates, silicates, ortho phosphates, pyrophosphates--

UNITED STATES PATENT OFFICE
CERTIFICATE OF CORRECTION

Patent No. 3,761,419　　　　　Dated Sept. 25, 1973

Inventor(s) HEINZ GUNTER NOSLER, RICHARD WESSENDORF and HORST BELLINGER

It is certified that error appears in the above-identified patent and that said Letters Patent are hereby corrected as shown below:

IN THE PATENT APPLICATION

Col.　Line　　　Page　Line

Claim 1 (Cont'd)　　　Under (c) between "by" and "weight", "bicarbonates, silicates, ortho phosphates, pyrophosphates," should be cancelled.

Signed and sealed this 29th day of October 1974.

(SEAL)
Attest:

McCOY M. GIBSON JR.　　　　C. MARSHALL DANN
Attesting Officer　　　　　Commissioner of Patents